(12) United States Patent
Cesta

(10) Patent No.: US 10,701,902 B1
(45) Date of Patent: Jul. 7, 2020

(54) ANIMAL GROOMING STATION WITH SAFETY RELEASE

(71) Applicant: Carmen Cesta, Cicero, NY (US)

(72) Inventor: Carmen Cesta, Cicero, NY (US)

( * ) Notice: Subject to any disclaimer, the term of this patent is extended or adjusted under 35 U.S.C. 154(b) by 0 days.

(21) Appl. No.: 16/293,039

(22) Filed: Mar. 5, 2019

(51) Int. Cl.
| A01K 13/00 | (2006.01) |
| A61D 3/00 | (2006.01) |
| A01K 27/00 | (2006.01) |
| G08B 7/06 | (2006.01) |
| G08B 21/22 | (2006.01) |
| A01K 15/04 | (2006.01) |

(52) U.S. Cl.
CPC ............ *A01K 27/005* (2013.01); *A01K 13/00* (2013.01); *A01K 15/04* (2013.01); *G08B 7/06* (2013.01); *G08B 21/22* (2013.01)

(58) Field of Classification Search
CPC ...... A01K 27/005; A01K 13/00; A01K 15/04; A01K 1/0613; A61D 3/00; A61D 2003/003; A61D 2003/006; A61D 11/00
See application file for complete search history.

(56) References Cited

U.S. PATENT DOCUMENTS

| 3,540,089 | A | 11/1970 | Franklin |
| 3,583,368 | A | 6/1971 | Mandelhaum et al. |
| 3,589,341 | A | 6/1971 | Krebs |
| 4,041,905 | A | 8/1977 | Prager et al. |
| 4,186,690 | A | * | 2/1980 | Seiler ..................... A01K 13/00 119/772 |
| 5,960,746 | A | 10/1999 | Salts |
| 6,286,190 | B1 | 9/2001 | Friend et al. |
| 6,671,933 | B1 | 1/2004 | Friend et al. |
| 7,946,253 | B2 | 5/2011 | Smith et al. |
| 8,365,685 | B2 | 2/2013 | Simons |
| 9,314,001 | B2 | 4/2016 | Siwak |
| 10,051,837 | B2 | 8/2018 | Hickman et al. |
| 2012/0210949 | A1 | 8/2012 | Polacek |
| 2015/0100037 | A1 | 4/2015 | Allsup |
| 2017/0020107 | A1 | 1/2017 | Storum et al. |
| 2018/0132451 | A1 | 5/2018 | Arndt et al. |
| 2018/0235180 | A1 | 8/2018 | Gardner et al. |

FOREIGN PATENT DOCUMENTS

| CN | 201967481 U | 9/2011 |
| CN | 202406771 U | 9/2012 |
| CN | 207969543 U | 10/2018 |
| WO | WO-2014043297 A2 | 3/2014 |
| WO | WO-2017197106 A1 | 11/2017 |

* cited by examiner

Primary Examiner — Kristen C Hayes
(74) Attorney, Agent, or Firm — Harris Beach PLLC

(57) ABSTRACT

A pet grooming station includes an electrically actuated separable coupler mechanically coupled between a tether point and a lead to a collar or a noose. At least one pressure sensitive mat is adapted to sense a presence of a person standing on the at least one pressure sensitive mat. The electrically actuated separable coupler is in a coupled state when the pressure sensitive mat senses the presence of the person standing on the mat. Or, when the person is not standing on the mat, the electrically actuated separable coupler separates following a predetermined or selectable time delay in a range of about 0 to 2 seconds. An upgrade kit or modification kit for a pet grooming station and a method for safely grooming an animal on a grooming table are also described.

19 Claims, 13 Drawing Sheets

PRIOR ART

US 10,701,902 B1

ANIMAL GROOMING STATION WITH SAFETY RELEASE

FIELD OF THE APPLICATION

The application relates to animal grooming stations and particularly to animal grooming stations which restrain the animal by a lead, collar or noose.

BACKGROUND

Pet grooming stations provide efficient platforms for an animal groomer to comfortably work sitting or standing next to an animal being cared for. However, there is some risk of injury to the animal, should it walk, jump, or fall off the table, particularly where the animal is restrained or tethered by a lead or loop around the animal's neck or head, sometimes referred to as a noose.

SUMMARY

A pet grooming station includes a grooming table or tub which is adapted to support an animal to be groomed. A tether point is affixed to or adjacent to the grooming table or tub. An electrically actuated separable coupler is mechanically coupled between the tether point and a lead to a collar or a noose. At least one pressure sensitive mat is disposed at a floor level about adjacent to the animal grooming table or tub. The at least one pressure sensitive mat is adapted to sense a presence of a person standing on the at least one pressure sensitive mat. An electronics controller is operatively coupled to both of the electrically actuated separable coupler and the at least one pressure sensitive mat. The electrically actuated separable coupler as controlled by the electronics controller, and is in a coupled state when the pressure sensitive mat senses the presence of the person standing on the pressure sensitive mat. Or, when the pressure sensitive mat senses that the person is not standing on the pressure sensitive mat the electronics controller causes the electrically actuated separable coupler to separate following a predetermined or selectable time delay in a range of about 0 to 2 seconds.

The tether point can include a tether point disposed in or on a grooming post. The grooming post can be fixed, adjustably coupled to or adjacent to the pet grooming station. The grooming post can also include a free-standing post. The tether point can include a hook or loop which is mechanically coupled to a wall of the pet grooming station, or an adjacent wall.

The pet grooming station can include a wash station where the hook or loop is mechanically coupled to a wall of the wash station.

The electrically actuated separable coupler can include an electrically actuated solenoid to hold or release a detachable part. The detachable part can include a magnet and/or the detachable part can include a ferrous metal.

There can be a second pressure sensitive mat located at about the floor level about adjacent to another side of the animal grooming table.

The pet grooming station can include an audible warning which sounds if the pressure sensitive mat indicates that the person is not standing on the pressure sensitive mat. The audible warning can include a buzzer and/or an electronic sound generator.

The pet grooming station can include a warning light which illuminates in a steady or a flashing pattern when the pressure sensitive mat indicates that the person is not standing on the at least one pressure sensitive mat.

The electronics controller can include at least one processor. The electronics controller can include a delay in hardware or in firmware which causes a pre-determined delay time between an indication of the person not present on the at least one pressure sensitive mat and to cause a separated state of the electrically actuated separable coupler. The pre-determined delay time can be a delay time between about 0 seconds and 2 seconds.

An upgrade kit or modification kit for a pet grooming station includes an electrically actuated separable coupler which is adapted to be mechanically coupled between a tether point of the pet grooming station or to an adjacent tether point, and a lead to a collar or a noose. At least one pressure sensitive mat is adapted to be disposed at a floor level about adjacent to a pet grooming table or tub, the at least one pressure sensitive mat adapted to sense a presence of a person standing on the pressure sensitive mat. An electronics controller is configured to be operatively coupled to both of the electrically actuated separable coupler and the at least one pressure sensitive mat. Following an assembly of the upgrade kit or modification kit, the electrically actuated separable coupler as controlled by the electronics controller, is in a coupled state when the at least one pressure sensitive mat senses the presence of the person standing on the pressure sensitive mat, or when the pressure sensitive mat senses that the person is not standing on the at least one pressure sensitive mat the electronics controller causes the electrically actuated separable coupler to separate following a predetermined or selectable time delay in a range of about 0 to 2 seconds.

A method for safely grooming an animal on a grooming table includes: providing at least one pressure sensitive mat adapted to be disposed at about a floor level for a person to stand on while grooming the animal, the at least one pressure sensitive mat adjacent to the grooming table, the grooming table adapted to support the animal wearing a collar or a noose to tether the animal to the grooming table by an electrically actuated separable coupler; sensing a presence or absence of the person by an electronics controller to establish a presence indication of the person on the at least one pressure sensitive mat; and controlling a coupled or released state of the electrically actuated separable coupler based on the presence indication, wherein in the presence of the person, the electrically actuated separable coupler remains coupled, and in the absence of the person standing on the pressure sensitive mat, the electrically actuated separable coupler following a predetermined or selectable time delay in a range of about 0 to 2 seconds separates to release a lead of the collar or noose.

In an event where the animal jumps or falls off the grooming table, the person can intentionally step off of the at least one pressure sensitive mat to release the lead to the collar of the animal to prevent accidental hanging or strangulation of the animal.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Definitions

Pet grooming station—A pet grooming station includes a raised surface so that an animal groomer can groom the animal at about a relatively standard table height which height may or may not be further adjustable. Any animal of appropriate size and weight can be groomed or examined on such a table, however most typically such tables are used to groom pet dogs or pet cats. The grooming station typically includes four table like legs and can include foldable or portable tables. A fold down grooming table or table fixed mounted to a wall is also included and suitable for the new structures and methods of the Application. Also, a suitable grooming table in a pet care vehicle may be mounted as a portable table, fixed table, or foldable table, typically against a wall of the vehicle. A pet grooming station may be used only for care of fur, including trimming, cutting, and other fur care. Also includes are pet grooming stations which have a liquid drain for wash water, including some table tops which may have one or more surfaces which slope in and down towards a drain to facilitate drainage. Also, there may be any suitable number of sides or raised surfaces of any suitable size and shape along any or all of the edges of the grooming table to help prevent an animal from falling off the table, as well as to contain fur or claw clippings from nail trimming. Also, there can be any suitable ledges, gutters, baskets, etc. and any combination thereof to hold pet grooming equipment, supplies and/or to catch waste fur, clippings, etc. which result from grooming animals. Pet grooming station as used hereinbelow also includes animal wash stations, such as, for example, home and commercial pet grooming tubs.

Tether point—Typically, a lead to a collar or a noose is secured by tying, a hook, or by clipping to a hook or eye on a grooming post. However, particularly for an animal wash station, there may more likely be a sliding bar or one or more hooks, eyes, or U shaped parts to clip on to. Or, there can be suction cups with hooks or eyes. Any suitable mounting point on which to affix or mechanically couple an electrically actuated separable coupler of the new system and method of the application is referred to herein as a tether point.

Figure 1:
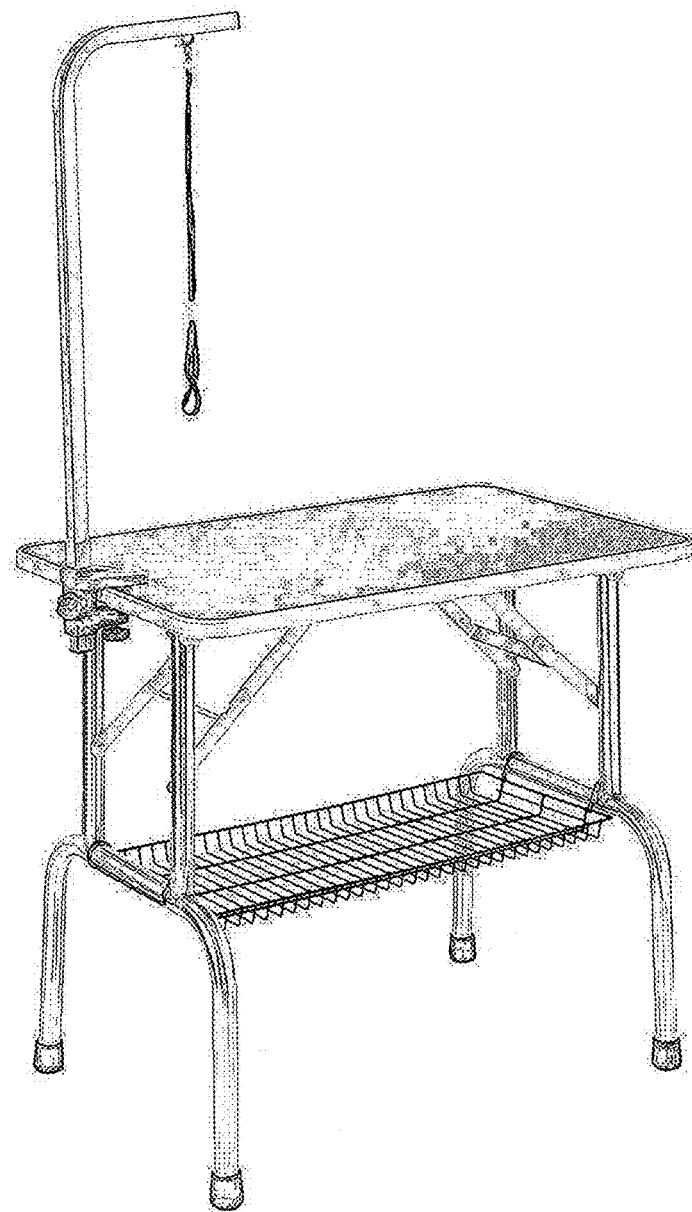
FIG. 1 is a drawing of an exemplary pet grooming station of the prior art.

Pet grooming stations are well known in the art, especially since the late 1970's. The advantage of a pet grooming station is that the animal is raised to about a normal table top working height. Also, the animal can be somewhat secured on the table by either a tether which clips to the animal's normal collar, or an adjustable noose. FIG. 1 is a drawing of an exemplary commercially available pet grooming station.

Typically, animal groomers are instructed to always have one hand on the animal while grooming, to maintain the position of the animal on the groom table surface, as well as to prevent the animal from walking, jumping, or otherwise falling off the grooming table. Unfortunately, a large number of animals are still injured or killed at pet grooming stations where they inadvertently leave the table top surface and end up hanging by their collar or a noose. What is needed is a system and method where an animal can be more safely tethered to the grooming post where in the event of a fall or any other inadvertent departure from the grooming table, the tether can be automatically released so as to prevent, or at least minimize injury to the animal, to avoid an accidental hanging.

For convenience, solutions of the Application are shown and explained in the context of the exemplary pet grooming station of FIG. 1. However, those skilled in the art will appreciate that the techniques and structures of the new system and method are generally applicable to any suitable grooming table fixed, portable, folding or mobile type animal grooming station. The new system and method of the Application is also suitable for use with wash stations, including animal grooming tubs.

Figure 2:
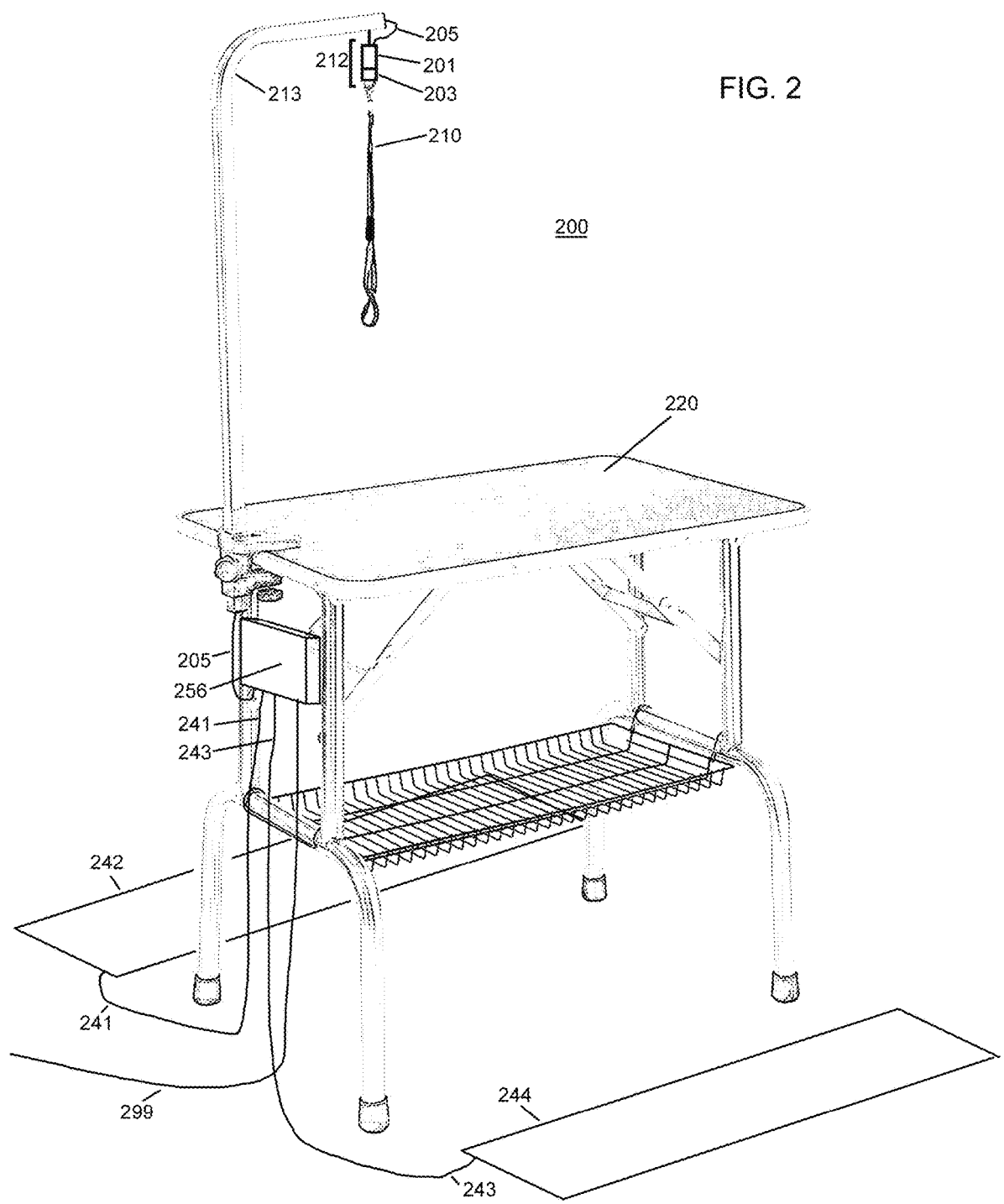
FIG. 2 is a drawing of the pet grooming station of FIG. 1 modified with the new structure of the Application.

FIG. 2 is a drawing of an exemplary pet grooming station according to the Application. The pet grooming station 200 includes an animal grooming table 220 adapted to support an animal to be groomed. A grooming post 213 is mechanically coupled at a first end of the grooming post to the animal grooming table 220. Typically, grooming posts are adjustably affixed as shown in FIG. 2. The grooming post 213 is adjustably coupled at about a first end of the grooming post, by an adjustable mechanical coupler (typically a sliding coupler) which allows the pole height to be set or adjusted for the sitting or standing height of the animal to be groomed. In other embodiments, there can alternatively be, for example, any suitable telescoping grooming post.

An electrically actuated separable coupler 212 includes an electrically actuated part 201 and a detachable part 203. The electrically actuated part 201 is mechanically coupled to an opposite end of the grooming post and adapted to releasably couple a lead or tether 210 and collar, or a tether and noose, affixed to the detachable part 203. The animal to be groomed is thus detachably connected to the grooming post 213 by the electrically actuated separable coupler 212.

At least one pressure sensitive mat 244 is disposed at a floor level about adjacent to the pet grooming station 200. Floor level refers to the surface on which the animal groomer stands. It is unimportant whether that level is the floor level of the surrounding room, or a raised or lower surface near the grooming station.

An electronics controller 256 is operatively coupled to both of the electrically actuated separable coupler parts and to the at least one pressure sensitive mat 244. The electrically actuated separable coupler as controlled by said electronics controller 256, is in a coupled state when the at least one pressure sensitive mat senses a presence of a person standing on the pressure sensitive mat 244. Or, when the at least one pressure sensitive mat senses that the person is not standing on the pressure sensitive mat 244, the electronics controller 256 causes the electrically actuated separable coupler to separate following a predetermined or selectable time delay in a range of about 0 to 2 seconds.

The new method for safely grooming an animal on an animal grooming table of the Application includes: the groomer standing on at least one pressure sensitive mat 244 disposed at a floor level adjacent to the animal grooming table 220 where an animal wearing a collar (or noose) is tethered to the grooming table 220 by an electrically actuated separable coupler 201. An electronics controller senses the presence or absence of the person to establish a presence indication of the person on the at least one pressure sensitive mat 244. The electrically actuated separable coupler 212 is controlled between a coupled or a released state based on the presence indication. In the presence of the person, the electrically actuated separable coupler remains coupled. However, in an absence of the person standing on the at least one pressure sensitive mat 244, the electrically actuated separable coupler separates to release the lead and collar of the animal by releasing the detachable part 203. There can be a delay time, such as for example, between about 0 to 2 seconds, from a detection of the absence of the person standing on the at least one pressure sensitive mat 244 (i.e. the groomer steps off the mat), and the electrically actuated separable coupler separating to release the lead and collar of the animal by releasing the detachable part 203.

Figure 3:
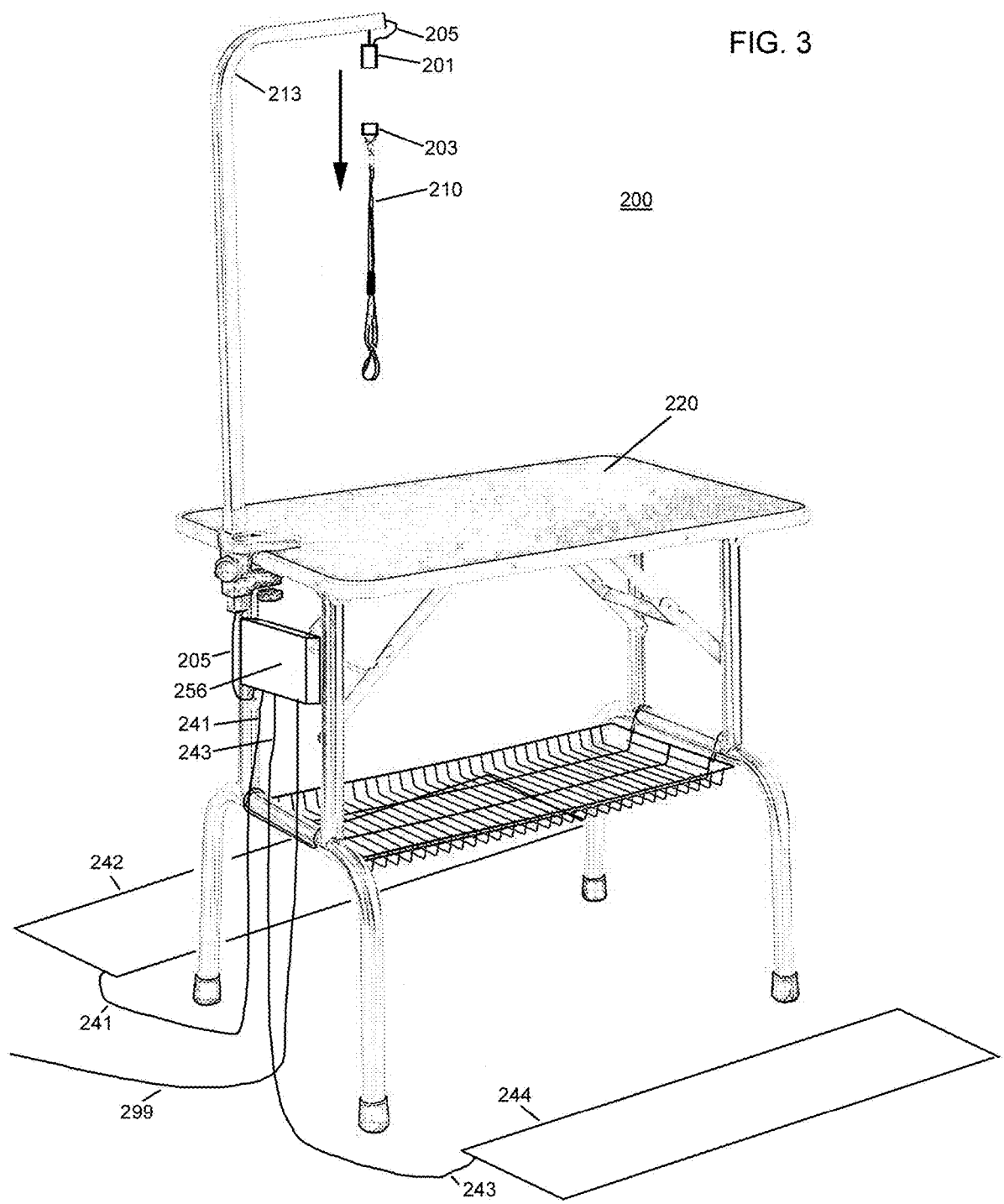
FIG. 3 is a drawing of the pet grooming station of FIG. 2 showing separation of the electrically actuated separable coupler.

FIG. 3 is a drawing of the pet grooming station of FIG. 2 showing the electrically actuated separable coupler separated, releasing the automatically detachable part 203 and the lead and collar of the animal from the grooming post 213.

In many typical grooming situations, the grooming station may allow enough floor space around the grooming station where the groomer can walk around the table. A problem is that typically a pressure sensitive mat 244 is supplied as a rectangular shape, extending along one side of the table. Therefore, to walk around to the other side of the table, the groomer, for example, first steps off of a first pressure sensitive mat 244, and then walks a few steps around the grooming table, before stepping onto the second pressure sensitive mat 242. The problem is that the electrically actuated separable coupler should not separate in this case where the groomer is simply moving from one side of the grooming station to another side while still in positive control of the animal, where the animal is not in danger.

The problem was solved by introducing a small (resettable) delay time between stepping off the pressure sensitive mat 244 and stepping back onto the second pressure sensitive mat 242, which applies in the opposite direction as well, when stepping off pressure sensitive mat 242 to move to pressure sensitive mat 244. The exact delay time can be either fixed or varied, however about 1 to 2 second delay has been found to be sufficient for the groomer to step off one pressure sensitive mat onto another pressure sensitive mat. The time delay is "resettable" in that once started, if within the 1 to 2 seconds a presence of a groomer on either mat is detected, the electrically actuated part 201 will not detach.

A trade-off for fixing or setting the delay time is that in normal operation, in the case of an inadvertent animal departure from the grooming table, the groomer can intentionally with purpose step off the mat to cause a separation of the electrically actuated separable coupler to prevent an accidental hanging. Therefore, the time from groomer step-off to tether 210 release should be fast enough to release the animal from the tether 210, or not much longer than about 1 to 2 seconds.

At least for the reason of moving from one mat to another, there will typically be a delay time from detection of an absence of the groomer on the mat to separation of the electrically actuated separable coupler. However, more generally, there may configurations where it is desirable to have no delay time, or less delay. Therefore, a preset or settable delay time is in a range from about 0 seconds to about 2 seconds. It may be possible to extend that delay time over 2 seconds, however at increased risk of an animal injury by accidental hanging.

Typically, the electrically actuated separable coupler 212, and the one or more pressure sensitive mats (242, 244) are wired to the electronics controller 256 by any suitable wires or cables. For example, in the exemplary embodiment of FIG. 2, the pressure sensitive mats 242, 244 are cabled to the electronics controller 256 by cables 241, 243 respectively, and the electrically actuated separable coupler 212 is connected the electronics controller 256 by cable 205. Cable 205 can optionally be routed in part or in whole through a hollow part of a grooming post 213.

Electrical power—The grooming station will usually include a conventional AC power cord 299 with any suitable AC/DC power supply disposed inline or within the electronics controller 256 enclosure, or a separate power supply which supplies any suitable DC voltage to power the electronics controller 256. In some applications, such as, for example, for a mobile grooming situation, the components, including the electronics controller 256 and electrically separable coupler 212, can be adapted to operate from a standard vehicle DC power supply, such as a van or truck 12V DC battery bus. Also, instead of a direct AC power cable connected to the grooming station, a modular "wall wort" power supply can be used to supply a relatively low voltage DC power to the electronics controller 256 and other components for any of the reasons of economy, safety, and/or convenience.

Connections between components—Any suitable operative connections can be used, such as for example, any suitable wireless connection between each of the pressure sensitive mats (e.g. by a battery operated wireless device) and the electronics controller 256. The electronics controller 256 can operate the electrically actuated separable coupler 212 based on any suitable logic, including hard wired logic with or without a relay. The electronics controller 256 would typically, but not necessary, include a processor, such as, for example, a processor based microcontroller or microcomputer.

Figure 4:
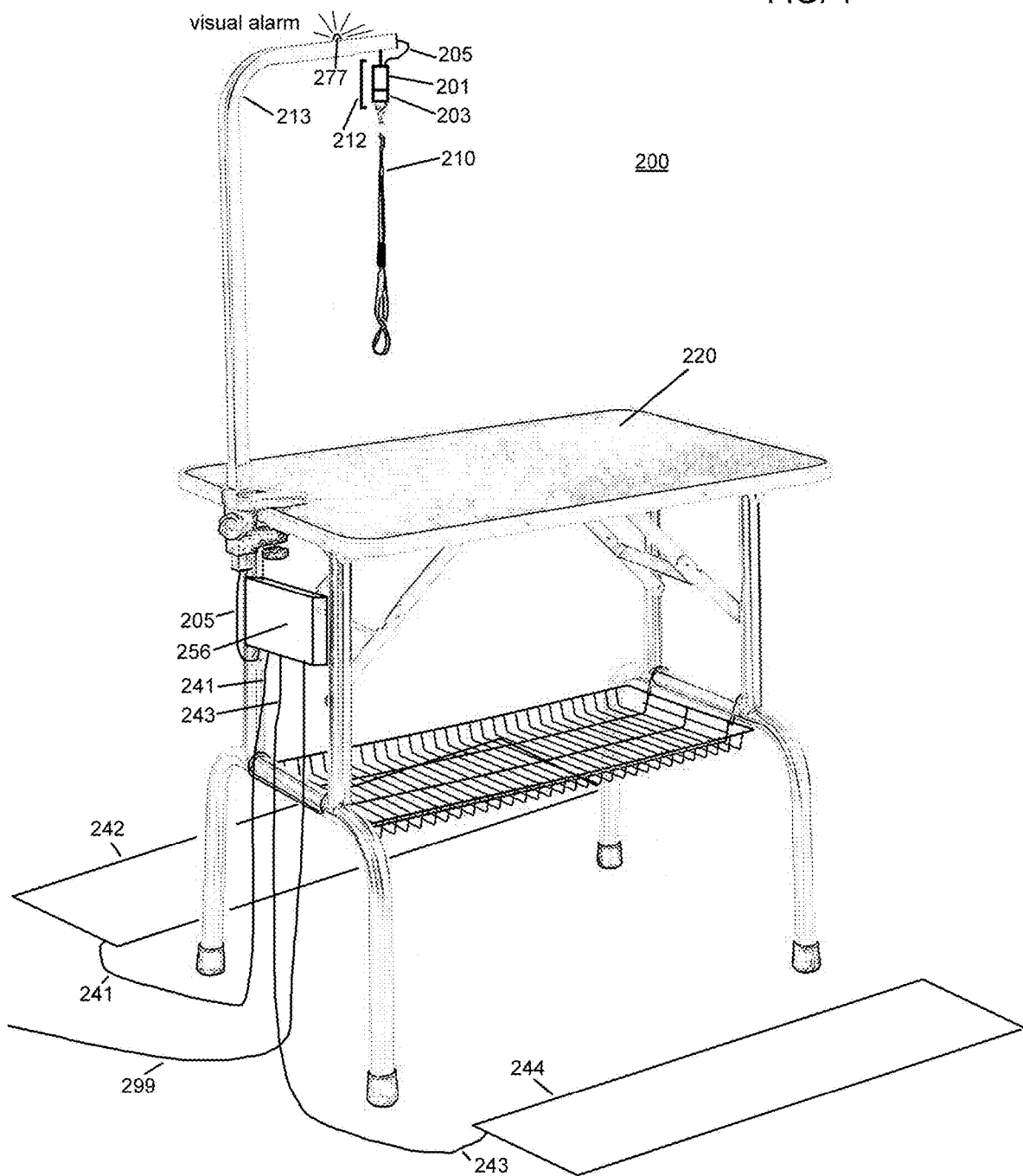
FIG. 4 is a drawing of the pet grooming station of FIG. 2 with a visual warning.

Optional visual or audio warning—The groomer can be warned of an impending automatic separation of the electrically actuated separable coupler 212 which will free the animal. FIG. 4 is a drawing of the pet grooming station of FIG. 2 showing an additional visual warning disposed at about eye level on the grooming post. The visual warning can use at least one or more of any suitable light, lamp, or bulb. For example, there can be one or more steady or flashing LEDs of any suitable type, brightness, color, and any combination thereof.

In some configurations, the visual warning can light immediately (substantially without delay) on detection of the groomer stepping off a pressure sensitive mat. That way, if the groomer accidentally shifts their weight off the pressure sensitive mat, they will have at least a moment of time following the warning, rather than being first surprised by an actual tether release freeing the animal from the post where there is no apparent danger or risk to the animal.

Figure 5:
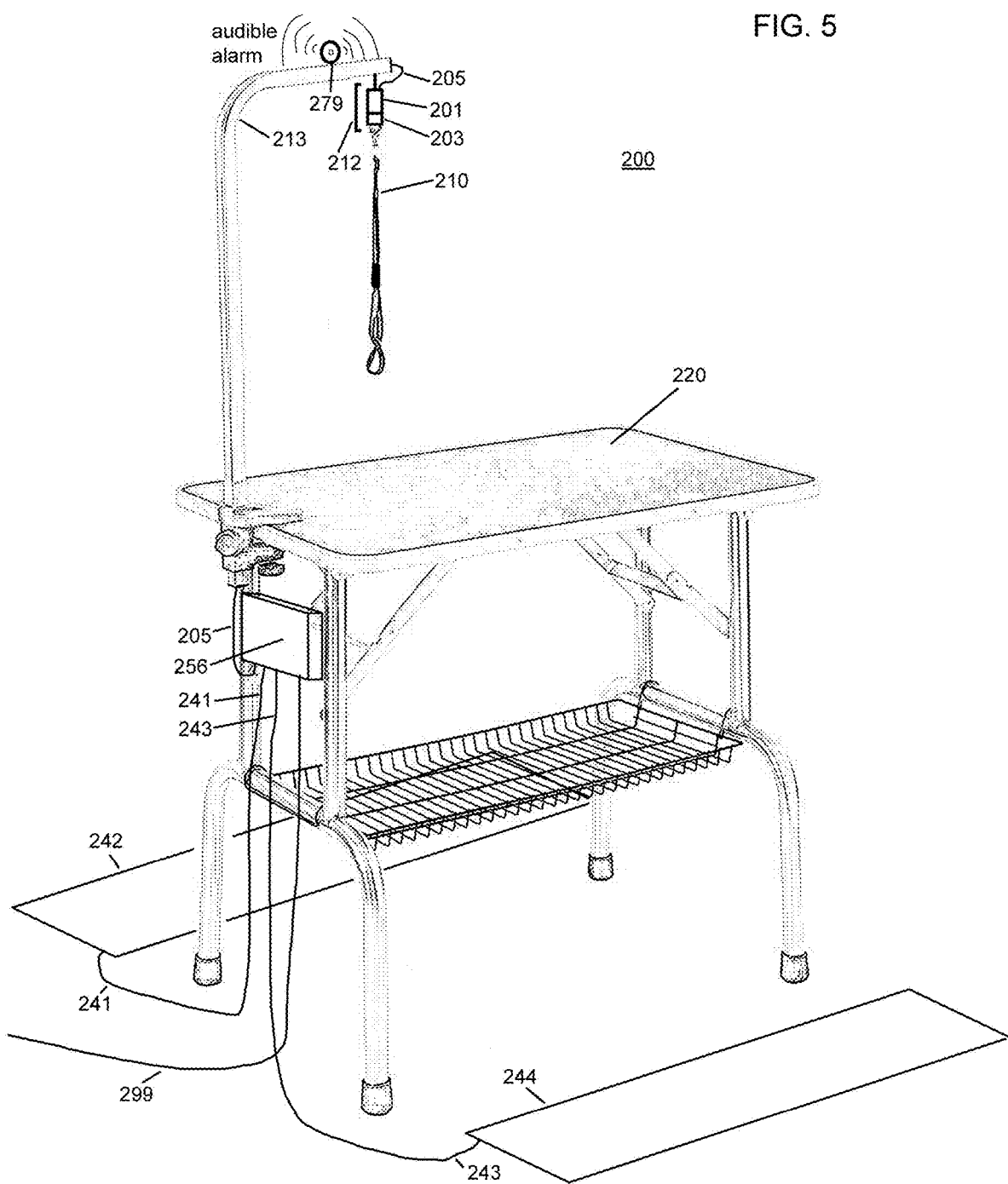
FIG. 5 is a drawing of the pet grooming station of FIG. 2 with an audio warning.

FIG. 5 is a drawing of the pet grooming station of FIG. 2 showing an additional audio warning disposed at about ear level on the grooming post. The warning can be any suitable tone or audio message (e.g. "tether separating" or "animal release"). The audio warning can be any suitable buzzer, speaker, tone generator, etc., or any suitable combinations thereof. The audio warning can operate as described hereinabove for the visual warning. Either one separately, or both together, can be present.

There can be any suitable box or enclosure to house either one of or both of a visual or audio warning. Or, either or both of a visual and audio warning can be physically mounted into or on the grooming post itself.

Electrically actuated separable coupler—Any suitable electrically actuated separable coupler 212 can be used where electrically actuated part 201, holds or releases a detachable part 203 or equivalent thereof. For example, typically the electrically actuated separable coupler will include any suitable electromagnet or solenoid device which magnetically couples to any suitable magnet or releasable ferromagnetic part, such as a ferromagnetic puck with a hook, loop, clip, or any other suitable fastening means for a tether or leash.

A suitable coupler for the new system and method of the Application includes, for example, use of a relatively light weight, but relatively strong magnetic field rare-earth magnet, held captive or released by any suitable electromagnet, such as a solenoid type electromagnet.

Figure 6:
FIG. 6 is a drawing showing an exemplary electromagnet and mechanical eye.

FIG. 6 is a drawing showing an exemplary suitable electromagnet for use as electrically actuated part 201 and an exemplary magnet mounted with a mechanically coupled mechanical eye 601 for use as detachable part 203 to which a tether can be clipped or tied. The tether can extend into or be coupled to a typically adjustable noose, lead or a collar. The collar can be part of the equipment of the grooming station, or there can be a general purpose clipping mechanism which can clip to the dog's regular collar.

The at least one electrically actuated separable coupler need not be a magnet (detachable part) and electromagnet (electrically actuated part) pair. For example, instead of a solenoid operated electrically actuated part 201 and magnet and/or one or more ferrous parts, there can be any suitable opening jaw, loop, clip, etc. operating by any suitable electrically controlled means. For example, there can be a motor driving worm gear which can open a jaw, or to retract a straight or rounded hook part or section to release a captured tether or leash. Or, alternatively, there can be any suitable electrically releasable latch or clasp means, such as opened by powering any suitable electromagnetic device, typically operated by an electrical solenoid or solenoid based device.

A dog grooming station suitable for use with the new system and method of the application can be manufactured using any suitable materials including metals, plastics, synthetic materials, wood, or any combination thereof. A solenoid, motor, movable claw, retractable or movable latch, or any combination thereof can be used for the electrically actuated part of the detachable part of the electrically actuated separable coupler is typically made of metals such as steel and copper wire for electromagnets. Any suitable ferrous material, permanent magnet or any combination thereof, can be used for the detachable part of the electrically actuated separable coupler. Suitable AC solenoids may include a non-ferrous metal in the detachable part. Any suitable leashes with nooses, leashes with collars, leashes adapted to couple to an animal's regular collar, etc. can be used with the detachable part of the electrically actuated separable coupler. Any suitable mechanical coupling can be used to couple the leash, lead, or noose to the detachable part including tying to, clipping on, clamping, latching, etc. The detachable part can include any suitable mechanical structure to accept the leash, lead, or noose including a mechanical hook, eye, through hole, threaded hole, bayonet coupler, hole, slot, etc. Mechanical couplings used to couple the leash, lead, or noose to the detachable part can be made from any suitable metal, plastic, composite, wood, etc., or any combination thereof.

Optional reduced hold force during delay time—As described hereinabove, the electrically actuated separable coupler couples an electrically actuated part to a detachable part. The electrically actuated part is typically magnetically coupled to the detachable part with a retention force sufficient to prevent an inadvertent de-coupling for typical animals to be groomed, such as, for example, a relatively large dog. Also, as described hereinabove, it is desirable to implement an optional delay time between about 0 seconds and two seconds from when an absence of a person is detected from one or more pressure sensitive mats.

One rationale for the delay time of about 0 to 2 seconds from mat step-off to automatic separation of the electrically actuated separable coupler is that if a groomer inadvertently steps off the mat, or steps off one mat on one side of the grooming station to move to another mat on the other side of the grooming station, the electrically actuated separable coupler will not immediately separate, where there is no immediate danger to the animal and where an inadvertent separation and unintentional release of the animal might in and of itself cause a dangerous situation for either the groomer, the animal, or both of them.

However, another problem is that there still could be some risk of an animal departing the grooming table reaching the end of the freedom of motion of a lead to a collar or a noose which results in an injury to the animal.

One solution is a system and method according to the application with the additional feature that during the 0 to 2 seconds from mat step-off delay time, the retention force of the electrically actuated separable coupler is automatically reduced to where the couple does not automatically separate, however where the retention force is so reduced that if the animal does depart the grooming table during the 0 to 2 seconds from mat step-off delay time, the weight of the animal will pull the electrically actuated separable coupler apart.

For example, an electrically actuated separable coupler when energized, can be set for a 50 pound retention force. It is unimportant if the retention force is pre-set (e.g. by model of solenoid used), or settable or adjustable (e.g. by varying the electrical current when the electrically actuated part is energized). According to the additional feature, where the retention force is reduced during the 0 to 2 seconds from mat step-off delay time, the retention force could be, for example, automatically reduced to 2 pounds during the 0 to 2 seconds from mat step-off delay time. During the lower level of retention, during the 0 to 2 seconds from mat step-off delay time, the detachable coupler has a lower level of retention of, for example, two pounds of tension to merely hold the coupler in a retained position, but where any relatively slight movement of the animal or tugging on the loop, lead or noose can result in a relatively easy detachment of the lead to a collar or a noose, during the higher risk period of injury.

That way, the lead to a collar or a noose would remain attached (the lead to a collar or a noose weighing less that 2 pounds, however should the animal leave the table during the delay time, the weight of the falling animal would cause a relatively easy and quick separation of the electrically actuated separable coupler without causing a hanging or strangulation type injury.

This optional feature of reduced retention force during the 0 to 2 seconds from mat step-off delay time can also be particularly effective where a groomer intentionally jumps off the pressure sensitive mat with the intent to release the lead to a collar or a noose, because despite their best efforts to control the animal, the groomer witnesses the animal inadvertently departing from the grooming table.

The exact preset or adjustable levels of electrically actuated separable coupler retention force are unimportant to the new system and method of the application. Typically, it is expected that the normal level of retention force would be in a range of about 6 pounds (e.g. for small cats) to about 20 pounds (e.g. for larger cats), and about 10-15 pounds for small dogs to about 50 to 80 pounds for medium sized dogs, and about 75 to 150 pounds for the largest dogs. The reduced retention force can be set appropriate to the lead to a collar or a noose apparatus in use, typically in a range of about 1 pound for the lightest lead and collar or noose to about 5 pounds for heavier leads and associated collars or nooses.

The optional reduced hold force during delay time can be implemented, for example, in a solenoid based electrically actuated separable coupler system, by reducing the solenoid current during the about 0 to 2 seconds from mat step-off delay time. Then, following the reduced current during the 0 to 2 seconds from mat step-off delay time, the current can be reduced to about zero, for automatic separation of the electrically actuated separable coupler.

Alternative leads or harnesses—There are a great variety of harness types useful to secure an animal to be groomed to a grooming table or animal bath or wash station. The electrically actuated separable coupler described hereinabove can be used with any suitable type of animal tether. Those skilled in the art will understand that all that is important is for the electrically actuated separable coupler to be able to automatically separate to prevent an accidental hanging or strangulation injury to an animal which inadvertently leave a grooming table or wash station tub. Where there is a single lead or tether, the structures described hereinabove can be used.

In some grooming or bathing stations (including wash or grooming tubs), there can be multiple lead or tether harness connections to a grooming post or frame. For example, one common grooming harness system uses a lead to a collar or a noose around the animal's neck in addition to a second harness around the animal's midsection or hind section to further stabilize the animal during grooming. In such cases, there are typically two hard connections of leads or tethers to the grooming post or other suitable grooming structure of the grooming station.

Multiple electrically actuated separable couplers—Where there are multiple connections of tethers to the grooming station, there can also optionally be an electrically actuated separable coupler at more than one connection or at each of the connections. That way, where a person steps off one at least one of, one or more pressure sensitive mats, more than one electrically actuated separable couplers can separate as described hereinabove. Accordingly, two or more electrically actuated separable couplers can separate immediately, or more typically, after about a 0 to 2 second delay following a detection of the groomer stepping off the pressure sensitive mat. Also, as described hereinabove, there can be a second reduced level of retention force of two or more electrically actuated separable couplers during the 1 to 2 second delay time.

Exemplary uses of single and multiple electrically actuated separable couplers according to the new system and method of the Application—In the examples which follow, one or more electrically actuated separable couplers are shown in modified drawings of exemplary prior art pet grooming stations. Understood to be present, however not shown for simplicity of illustration, are one or more pressure sensitive mats, and an electronics controller operatively coupled to both the at least one or more pressure sensitive mats, and the one or more electrically actuated separable couplers.

Figure 7B:
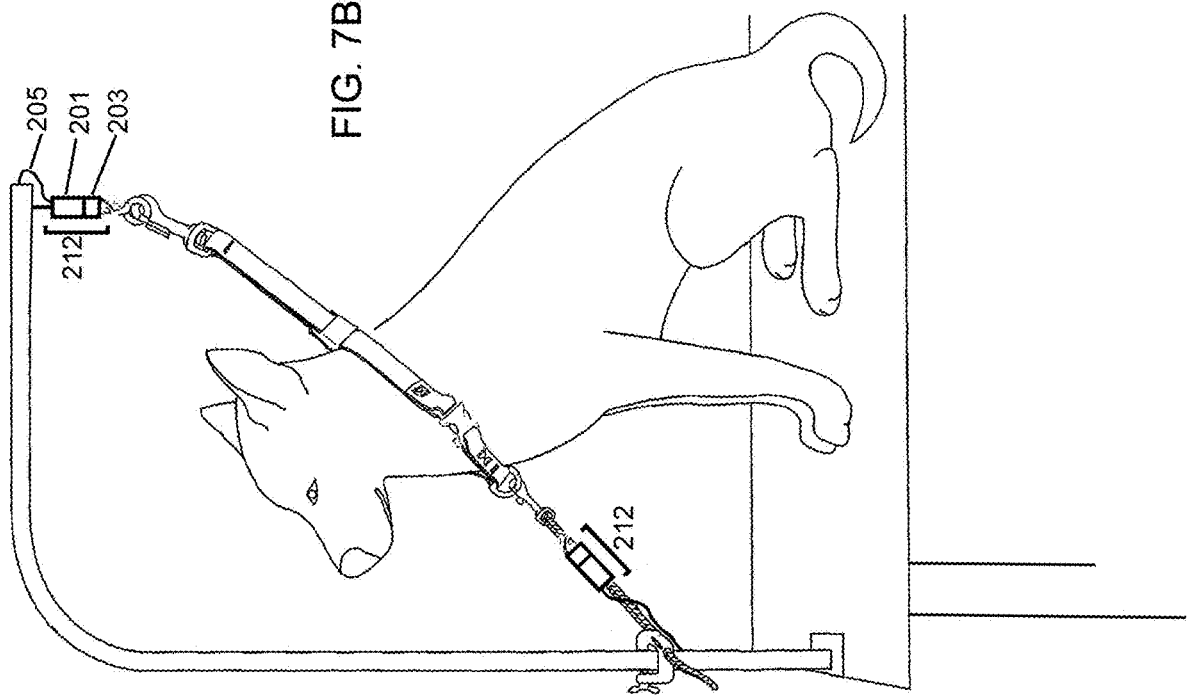
FIG. 7B shows the exemplary flexible loop or angled harness of FIG. 7A as modified by the addition of two electrically actuated separable couplers.
Figure 7A:
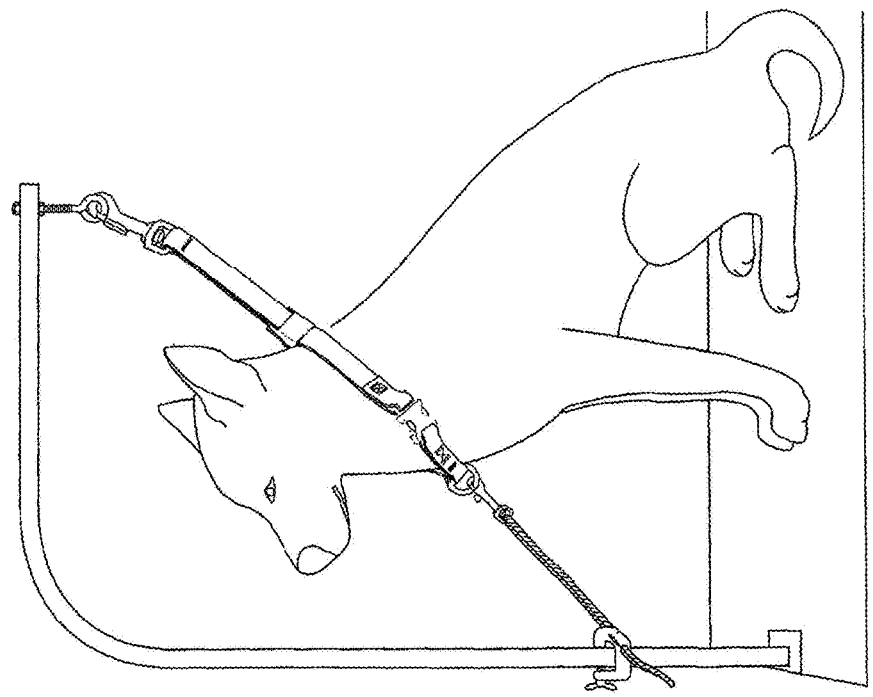
FIG. 7A shows an exemplary flexible loop for restraining animals during handling such as during grooming or examination or operation or in bath tubs.

FIG. 7A shows an exemplary flexible loop for restraining animals during handling such as during grooming or examination or operation or in bath tubs as described by U.S. Pat. No. 8,365,685. FIG. 7B shows the exemplary flexible loop or angled harness of FIG. 7A as modified by the addition of two electrically actuated separable couplers 212. Any such structures using a second attachment point, or a second tether, typically at an animal's chest height, sometimes referred to as groomer's helpers, can be so modified according to the new system and method of the Application.

Figure 8B:
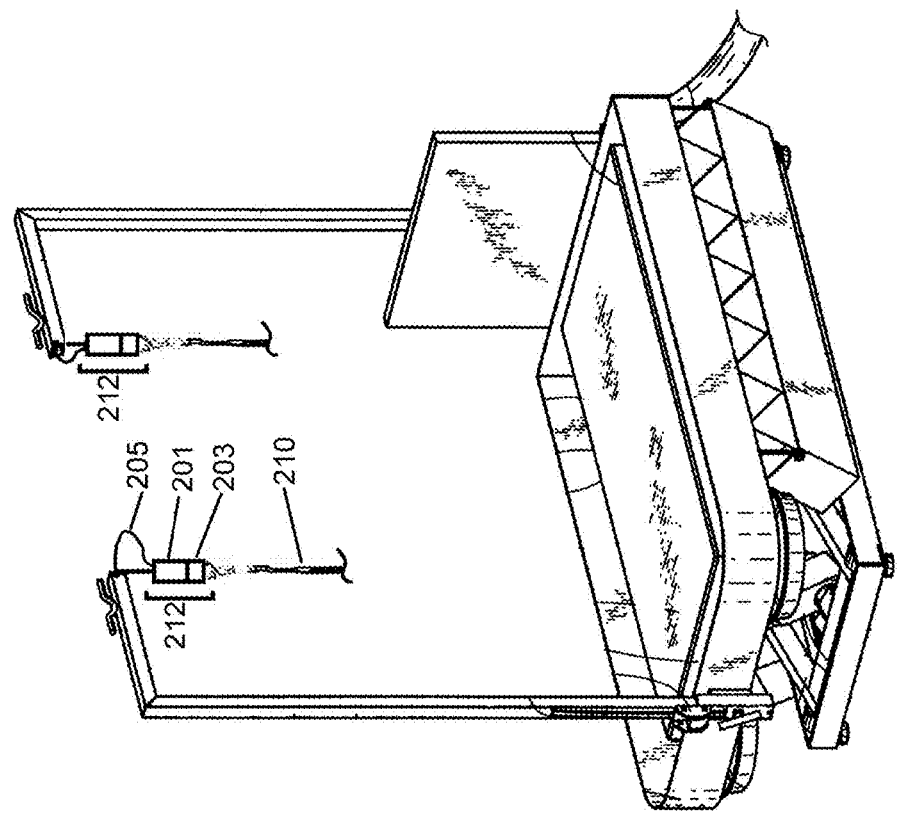
FIG. 8B shows the exemplary L-shaped posts of FIG. 8A as modified by the addition of two electrically actuated separable couplers.
Figure 8A:
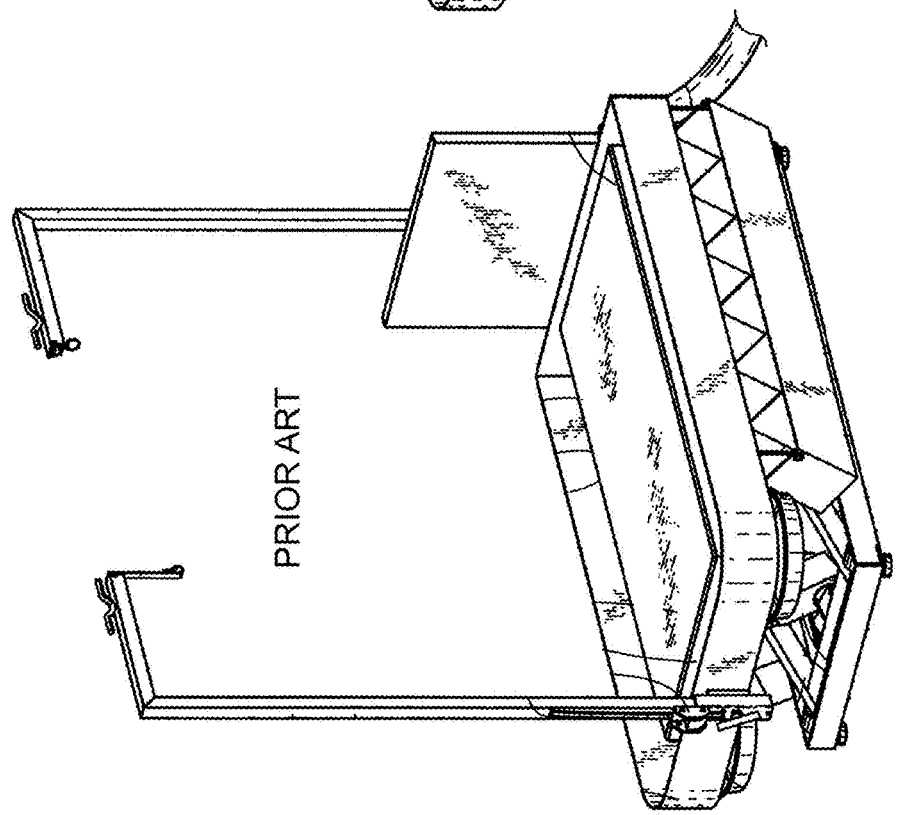
FIG. 8A shows an exemplary pet grooming stand with two elongated L-shaped posts.

FIG. 8A shows an exemplary pet grooming stand with two elongated L-shaped posts as described in U.S. Pat. No. 7,946,253. Such double post systems can be used with two tethers, such as for a collar and hind portion tether, or for convenience in moving a single tether to groom opposite sides of the animal. FIG. 8B shows the exemplary L-shaped posts of FIG. 8A as modified by the addition of two electrically actuated separable couplers 212.

Figure 9B:
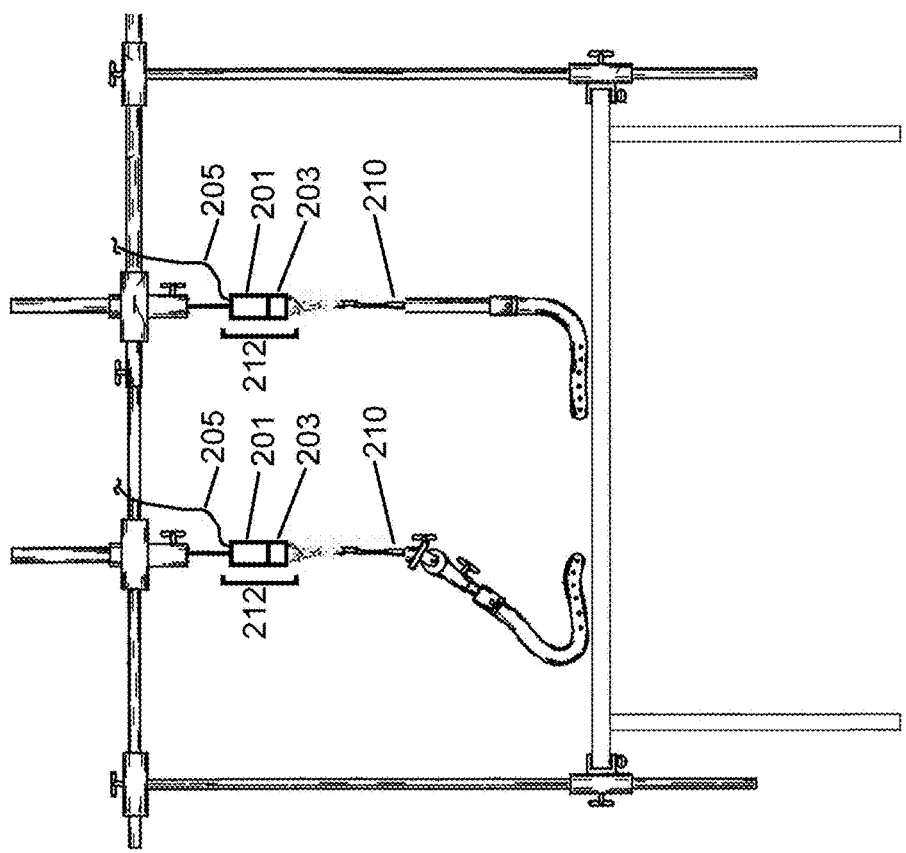
FIG. 9B shows the exemplary structure of FIG. 9A as modified by the addition of two electrically actuated separable couplers.
Figure 9A:
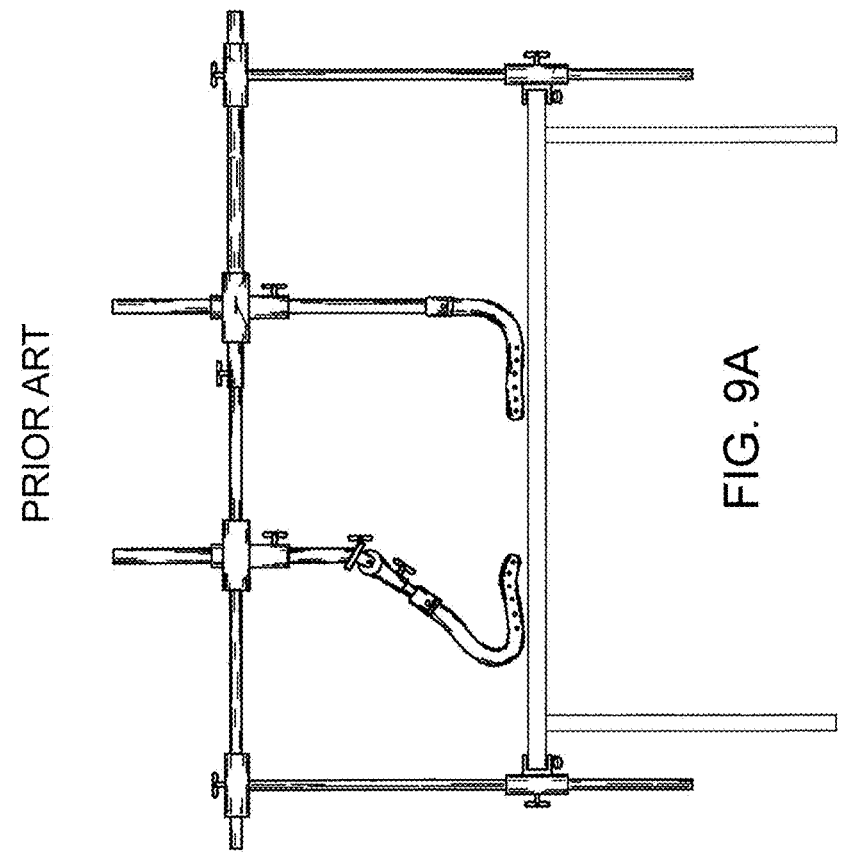
FIG. 9A shows an exemplary structure of the prior art to secure an animal by its neck, chest or haunch.

FIG. 9A shows an exemplary structure to secure the animal by its neck, chest or haunch as was described by U.S. Pat. No. 5,960,746. FIG. 9B shows the exemplary structure of FIG. 9A as modified by the addition of two electrically actuated separable couplers 212.

Figure 10B:
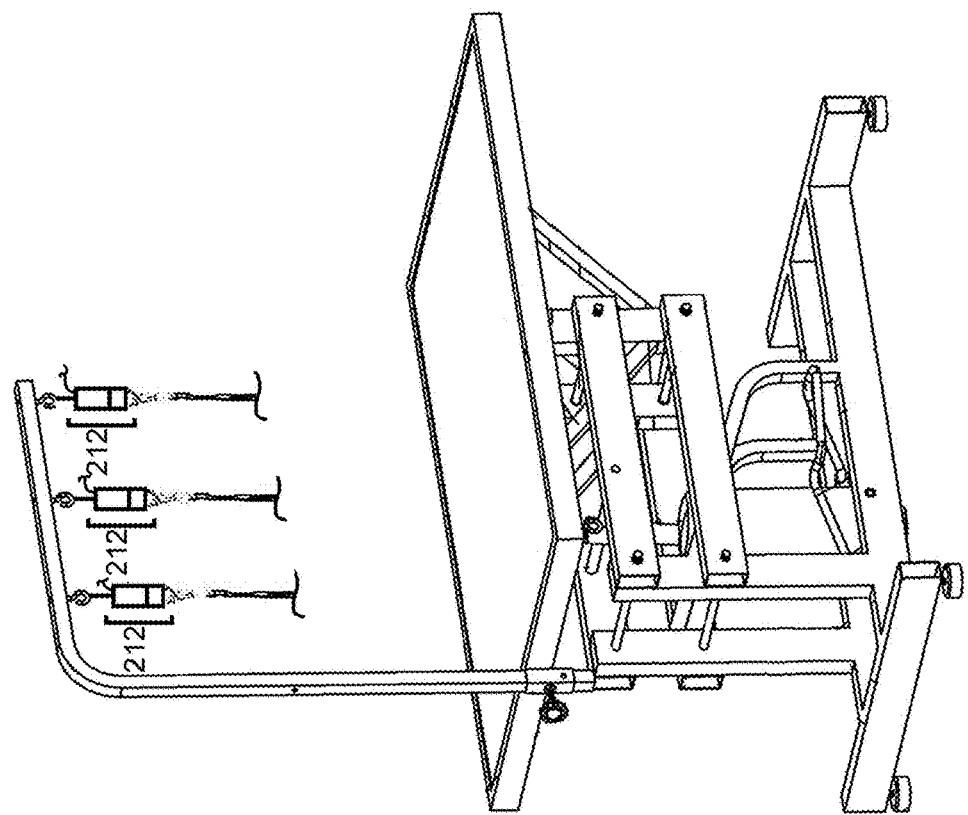
FIG. 10B shows the exemplary structure of FIG. 10A as modified by the addition of two electrically actuated separable couplers.
Figure 10A:
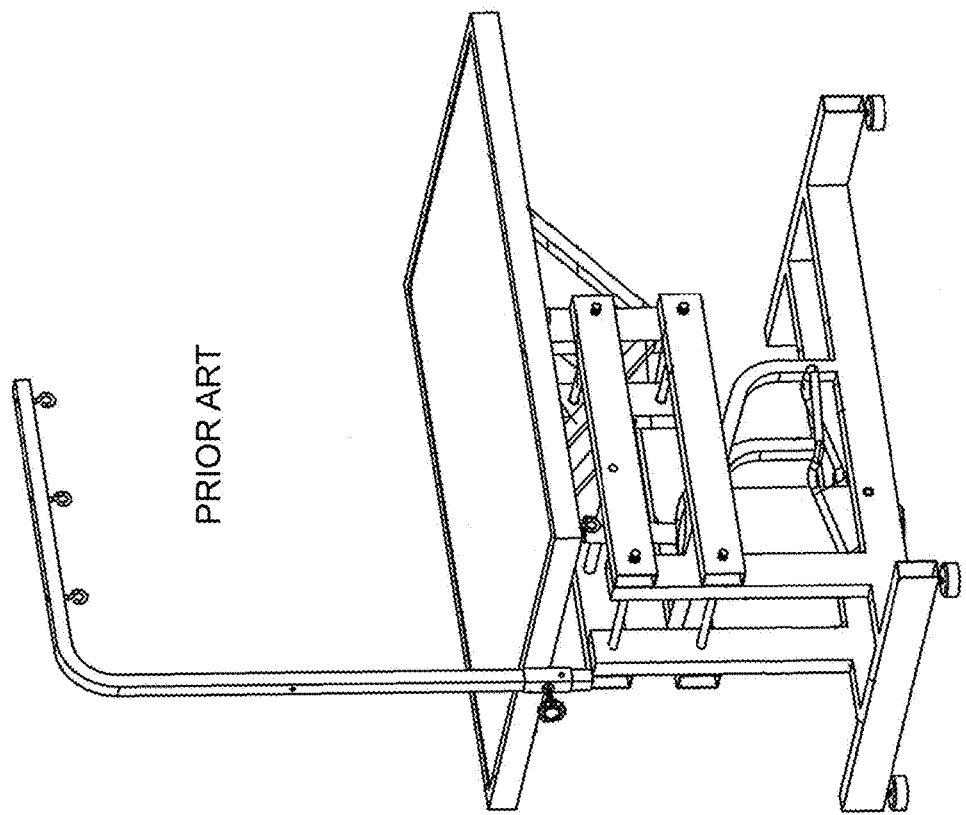
FIG. 10A shows an exemplary structure of the prior art with an L-shaped rod and multiple hooks.

FIG. 10A shows an exemplary structure with an L-shaped rod and multiple hooks as described by CN202406771U. FIG. 10B shows the exemplary structure of FIG. 10A as modified by the addition of two electrically actuated separable couplers 212.

Figure 11B:
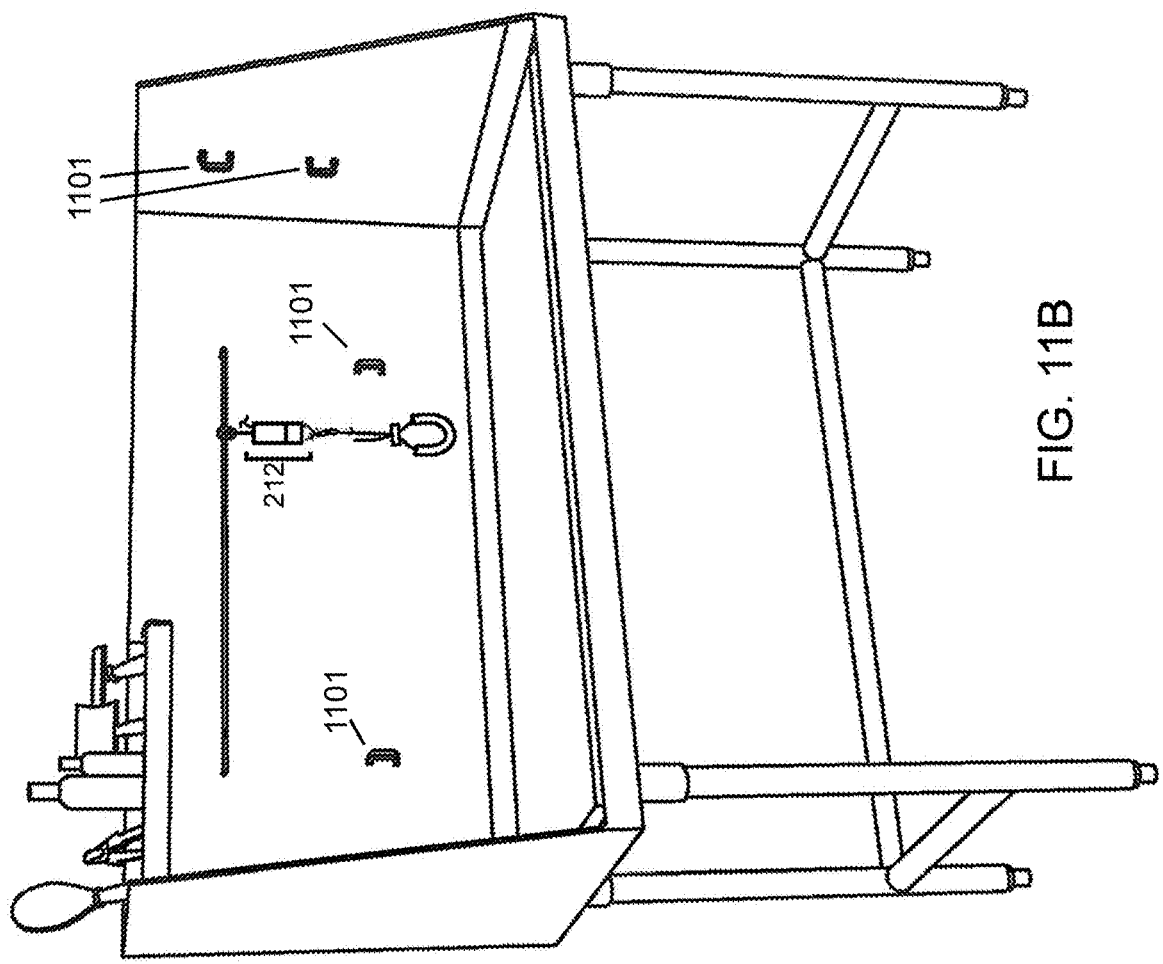
FIG. 11B shows the exemplary structure of FIG. 11A as modified by the addition of an electrically actuated separable coupler.
Figure 11A:
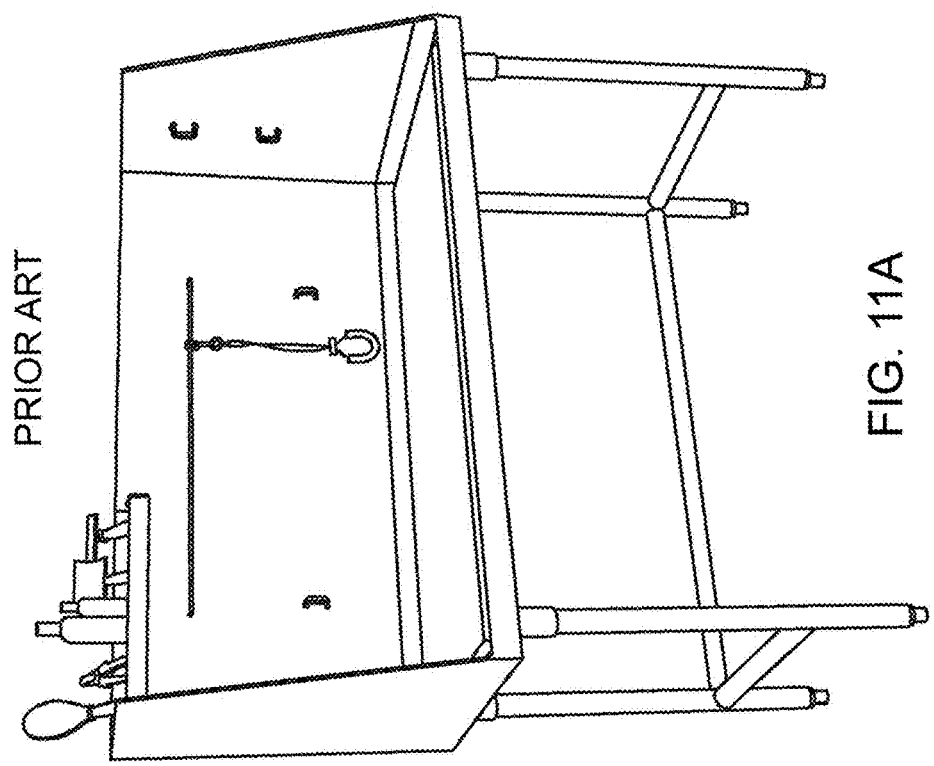
FIG. 11A shows an exemplary structure of the prior art with a restraining bar and multiple additional tethering points.

FIG. 11A shows an exemplary structure with a restraining bar and multiple additional tethering points 1101, as described by U.S. Patent Application Publication No. 2018/0132451. FIG. 11B shows the exemplary structure of FIG. 11A as modified by the addition of an electrically actuated separable coupler 212. Additional electrically actuated separable coupler 212 can optionally be affixed to any of the additional tethering points 1101. The slide bar and/or fixed tether connection points of FIG. 11B are also typical of animal wash stations, such as, for example, commercial animal tubs.

Figure 12:
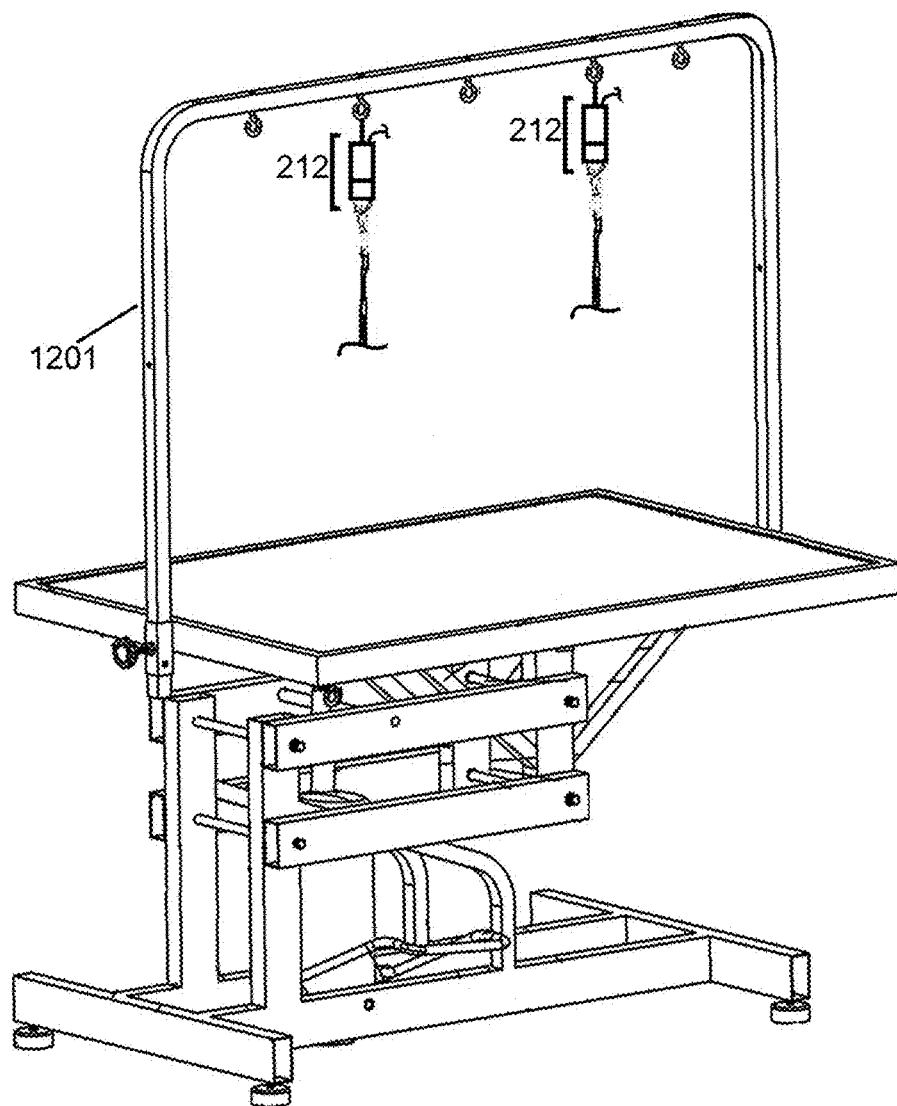
FIG. 12 shows the exemplary structure of FIG. 10A as modified by a U-shaped post.

Grooming post—Any suitable grooming post can be used. As described hereinabove, common grooming posts include rounded over or L shaped posts. Such posts can be fixed, or adjustably mounted to an examination or grooming table or wash stand. Another suitable grooming post includes a U-shaped post (See, for example: FIG. 12, U-shaped post 1201, opposite adjustable clamp not shown in FIG. 12), typically fixed, adjustably mounted at either or both of the opposite ends of the grooming or wash station. For example, with any of the multiple post or U-shaped type grooming posts, the animal being groomed can be secured both at the neck and/or shoulders and at the rear (e.g. hips) so that, for example, the animal remains standing during grooming.

The grooming post can also be present as one or more separate and unattached structures placed adjacent to an examination, grooming or wash station. In such cases, the one or more grooming posts need not be either fixed or adjustably mounted to the grooming or wash station. For example, there can be one or more grooming post stands adjacent to a grooming wash station. Such free-standing posts can be mounted in any suitable fashion, such as, for example, on a heavy base, or fixed or adjustable mounted to the floor and/or a wall in the vicinity of the grooming or wash station. Moreover, there can be any suitable combinations of the described grooming posts. Hooks, clips, eyes, etc., fixed or adjustably mounted to a surface (e.g. a wall or other suitable surface or post) of a grooming or wash station or to a nearby floor or wall surface are understood to be equivalent to a grooming post as used in the Application.

Figure 13:
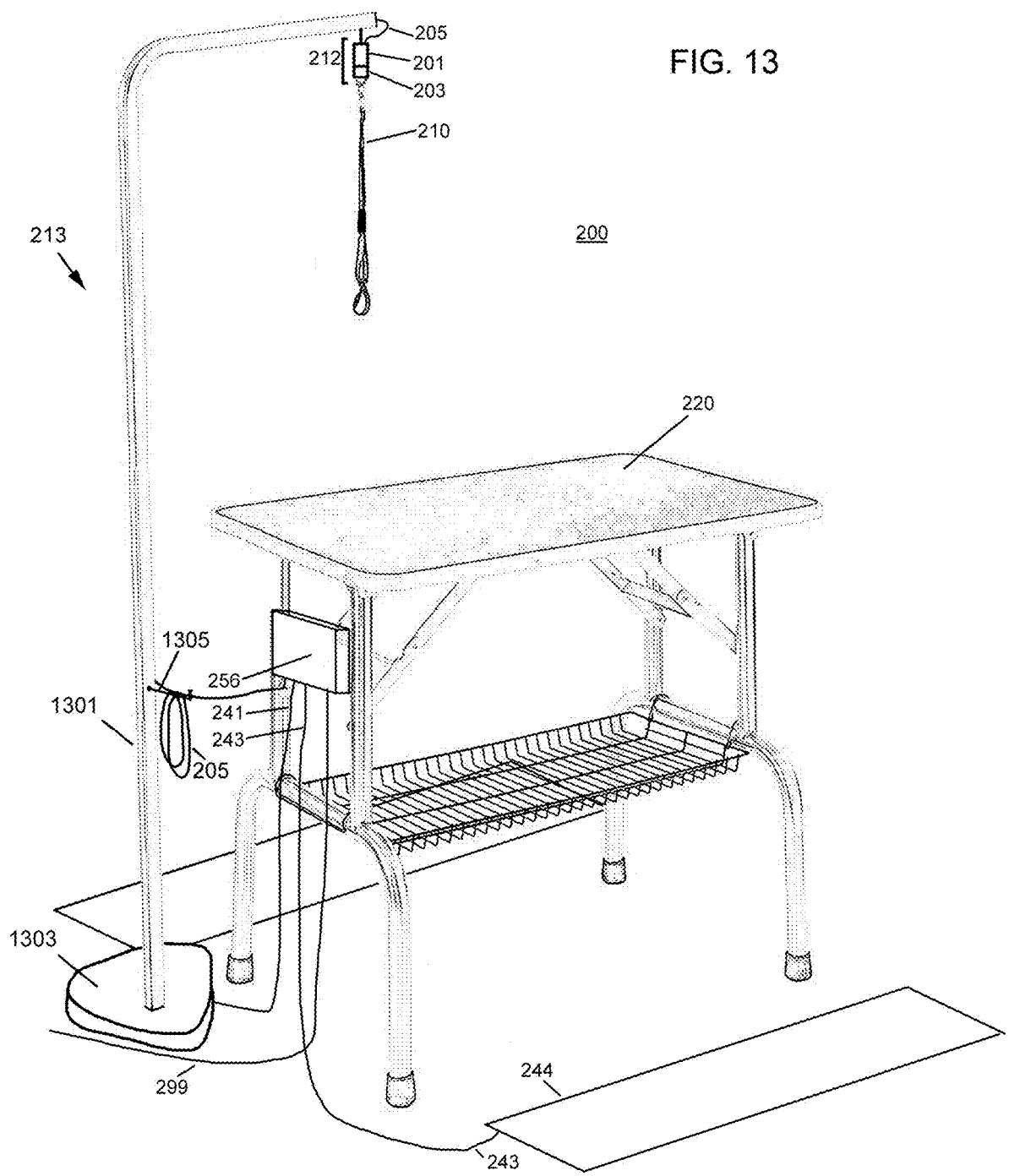
FIG. 13 shows the exemplary structure of FIG. 2 having a standalone grooming post.

FIG. 13 shows the exemplary structure of FIG. 2 where the grooming post 213 includes a standalone or free-standing grooming post 1301, a base 1303, and an optional hook 1305 to hold a coil of wire or cable 205. The free-standing grooming post 1301 can be optionally adjustable in height and/or length of the L shape by any suitable adjustment means (e.g. one rod, pipe or tubular section sliding with another pipe or tubular section, typically with a pin and multiple hole arrangement, or a friction clamp to set and hold a desired overlap). Similarly, the L shaped sections could have any suitable shape including, for example, any suitable curve shapes (e.g. an exact right angle of the exemplary L shape is unimportant to a free standing grooming post).

Suction cups—Where suitable surfaces are available, such as, for example, a wall of or near a wash station, suction cups (e.g. suction cups with hooks or eyes) can be used as an alternative to fixed mounted hooks or eyes.

In any of the exemplary structures, one or more electrically actuated separable couplers can be present on the original production or fabricated examination, grooming or wash station. Or one or more electrically actuated separable couplers, one or more pressure sensitive mats, and the electronics controller can be added later as an upgrade or modification to an original production or fabricated grooming or wash station. That is a retrofit unit can be attached to an existing grooming or wash station.

Upgrade or modification kits—Any suitable grooming or wash station can be modified by the structures described hereinabove, such as can be provided in an upgrade or modification kit of parts or assemblies. Typically, the upgrade product or kit includes at least one electrically actuated separable coupler, at least one pressure sensitive mat, an electronics controller, and any suitable wires, cables, and/or wireless devices to operatively couple the at least one electrically actuated separable coupler and the at least one pressure sensitive mat to the electronics controller. Moreover, where an electronics controller does not include a built-in power supply, any suitable power supply (e.g. a modular or plug in power supply (e.g. a "wall wort") can also optionally be provided. An electronics controller with a built-in power supply can include a connector for a power cord or a fixed mounted power cord (e.g. a standard three prong power cord for a standard wall outlet). The exact type of power supply means to power the electronics controller and at least one electrically actuated separable coupler via the electronics controller is unimportant.

Routing of cables—The exact routing of cables is unimportant. For example, wires or a cable between the electrically actuated separable coupler and the electronics controller can be fed through a center hollow of a round or rectangular tubular grooming post section, or wound around the post. Where there is no post, such as a hook or eyelet in a wall of or near a wash station, the wires or cables can pass through a hole in a wall, through any suitable conduit, or be supported or routed by any suitable cable ties or cable anchors.

Connectors—The exemplary drawings show direct cable connections between operatively wired components. However, there can optionally be removable, or detachable electrical or electronic connectors disposed at any suitable connection locations. For example, each of the wire or cable connections to the electronics controller can be optionally made through a removable or detachable connector. Also, there can optionally be an electrical connector near or about adjacent to where the electrically actuated separable coupler is coupled to the tether point, such as a hook or eye of a grooming post, or a hook or eye of a wall of the grooming station (including grooming tubs of wash stations) or a hook or eye of a nearby about adjacent wall. Such optional connectors can facilitate assembly or disassembly of the pet grooming station, or assembly or disassembly of an upgrade or modification kit to upgrade a conventional groom station according to the new system and method of the application. However, in other situations, such as, for example, where the grooming station is manufactured as one complete unit according to the Application, it may be more cost effective with fewer parts to directly wire cables at the various connection points without removable or detachable connectors.

Water resistant/Water proof parts—Generally, the electrically actuated part can be water resistant, to protect both the part and for electrical safety in the presence of grooming fluids, water, and animal fluids. However, particularly in wash station applications, the electrically actuated part can be water proof. Similar water resistant or water proof enclosures can be used to house the electronics controller. Typically, a low voltage control can be used where the at least one pressure sensitive mat is operatively coupled to the electronics controller, however the at least one pressure sensitive mat can also be water resistant or water proof, for any of the reasons of electrical safety and corrosion resistance of any metallic parts therein.

Grooming table accessories—A grooming table or wash station according to the Application can further include one or more racks, trays or hooks, and any combination thereof, such as, for example, to hold bottles of shampoo, conditioner, detangler, brushes, combs, shears, and any combination thereof. The edge of the grooming table can also include a rack, tray or hooks for the holding of bottles of shampoo, conditioner, detangler, brushes, combs and shears.

Animal wash stations—Animal wash stations are used by both professional animal groomers and pet owners. For example, animal wash stations are more commonly being made available to both professional pet groomers and pet owners at pet stores. Typically, there is a hook, eye, or bar, to tether the animal to keep the animal in the wash station tub during animal bathing. Any of the techniques, methods, and structures of the one or more releasable couplers described hereinabove can be applied to a personal (e.g. home, groomer's store, groomer's pet care vehicle) use or commercial animal wash station.

Where the electronics controller includes a processor, firmware and/or software to operate the pet grooming station can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A pet grooming station comprising:
   a grooming table or tub adapted to support an animal to be groomed;
   a tether point affixed to or adjacent to said grooming table or tub;
   an electrically actuated separable coupler mechanically coupled between said tether point and a lead to a collar or a noose;
   at least one pressure sensitive mat disposed at a floor level about adjacent to said animal grooming table or tub, said at least one pressure sensitive mat adapted to sense a presence of a person standing on said at least one pressure sensitive mat;
   an electronics controller operatively coupled to both of said electrically actuated separable coupler and said at least one pressure sensitive mat; and
   wherein said electrically actuated separable coupler as controlled by said electronics controller, is in a coupled state when the at least one pressure sensitive mat senses the presence of the person standing on the at least one pressure sensitive mat, or when the at least one pressure sensitive mat senses that the person is not standing on at least one of the at least one pressure sensitive mat the electronics controller causes the electrically actuated separable coupler to separate following a predetermined or selectable time delay in a range of about 0 to 2 seconds.

2. The pet grooming station of claim 1, wherein said tether point comprises said tether point disposed in or on a grooming post.

3. The pet grooming station of claim 2, wherein said grooming post is fixed or adjustably coupled to said pet grooming station.

4. The pet grooming station of claim 2, wherein said grooming post comprises a free-standing grooming post.

5. The pet grooming station of claim 1, wherein said tether point comprises a hook or loop mechanically coupled to a wall of said pet grooming station, or an adjacent wall.

6. The pet grooming station of claim 5, wherein said pet grooming station comprises a wash station and said hook or loop mechanically coupled to a wall of said wash station.

7. The pet grooming station of claim 1, wherein said electrically actuated separable coupler comprises an electrically actuated solenoid to hold or release a detachable part.

8. The pet grooming station of claim 7, wherein said detachable part comprises a magnet.

9. The pet grooming station of claim 7, wherein said detachable part comprises a ferrous metal.

10. The pet grooming station of claim 1, further comprising a second pressure sensitive mat disposed at the floor level about adjacent to another side of said animal grooming table.

11. The pet grooming station of claim 1, further comprising an audible warning which sounds if the pressure sensitive mat indicates that the person is not standing on said at least one pressure sensitive mat.

12. The pet grooming station of claim 11, wherein said audible warning comprises a buzzer or an electronic sound generator.

13. The pet grooming station of claim 1, further comprising a warning light which illuminates steady or flashing pattern when the pressure sensitive mat indicates that the person is not standing on said at least one pressure sensitive mat.

14. The pet grooming station of claim 1, wherein said electronics controller comprises at least one processor.

15. The pet grooming station of claim 1, wherein said electronics controller comprises a delay in hardware or in firmware which causes a pre-determined delay time between an indication of the person not present on said at least one pressure sensitive mat and a separated state of said electrically actuated separable coupler.

16. The pet grooming station of claim 15, wherein said pre-determined delay time comprises a delay time between about 0 seconds and 2 seconds.

17. An upgrade kit or modification kit for a pet grooming station comprising:
    an electrically actuated separable coupler adapted to be mechanically coupled between a tether point of said pet grooming station or to an adjacent tether point, and a lead to a collar or a noose;
    at least one pressure sensitive mat adapted to be disposed at a floor level about adjacent to a pet grooming table or tub, said at least one pressure sensitive mat adapted to sense a presence of a person standing on said at least one pressure sensitive mat;
    an electronics controller configured to be operatively coupled to both of said electrically actuated separable coupler and said at least one pressure sensitive mat; and
    wherein following an assembly of said upgrade kit or modification kit, said electrically actuated separable coupler as controlled by said electronics controller, is in a coupled state when the at least one pressure sensitive mat senses the presence of the person standing on the at least one pressure sensitive mat, or when the at least one pressure sensitive mat senses that the person is not standing on at least one of the at least one pressure sensitive mat the electronics controller causes the electrically actuated separable coupler to separate following a predetermined or selectable time delay in a range of about 0 to 2 seconds.

18. A method for safely grooming an animal on a grooming table comprising:
- providing at least one pressure sensitive mat adapted to be disposed at about a floor level for a person to stand on while grooming the animal, the at least one pressure sensitive mat about adjacent to the grooming table, the grooming table adapted to support the animal wearing a collar or a noose to tether the animal to the grooming table by an electrically actuated separable coupler;
- sensing a presence or absence of the person by an electronics controller to establish a presence indication of the person on said at least one pressure sensitive mat; and
- controlling a coupled or released state of said electrically actuated separable coupler based on said presence indication, wherein in the presence of the person, said electrically actuated separable coupler remains coupled, and in the absence of the person standing on at least one of said at least one pressure sensitive mat, said electrically actuated separable coupler following a predetermined or selectable time delay in a range of about 0 to 2 seconds separates to release a lead of the collar or noose.

19. The method of claim 18, further comprising the step of: in an event where the animal jumps or falls off said grooming table, the person stepping off of said at least one pressure sensitive mat to release the lead to the collar of the animal to prevent accidental hanging or strangulation of the animal.

\* \* \* \* \*